June 27, 1961 J. W. BLACK 2,990,191
SWIVELLED WHEELED DOLLY WITH OPEN FRAME
Filed Dec. 8, 1958

INVENTOR.
JOHN W. BLACK
BY
Woodhams Blanchard & Flynn
ATTORNEYS

United States Patent Office 2,990,191
Patented June 27, 1961

2,990,191
SWIVELLED WHEELED DOLLY WITH OPEN FRAME
John W. Black, Prairieville Township, Barry County, Mich., assignor to Pemco Wheel Company, Kalamazoo, Mich., a corporation of Michigan
Filed Dec. 8, 1958, Ser. No. 779,006
1 Claim. (Cl. 280—79.1)

This invention relates to dolly structure and it particularly relates to a structure having a single unitary piece comprising the main frame and utilizing portions of the supporting casters as reinforcing corner plates.

The common and wide spread use of various types of dolly structures has been too well known for many years and in a multitude of different arts to require discussion or elaboration. However, for the most part the dolly constructions with which I am acquainted have been made by some kind of fabricating process, such as welding together suitable pieces of angle iron with corner pieces for reinforcement. Casters of various types have then been affixed in some manner to the corner pieces.

This construction, or various modifications thereof, has been common for a great number of years and dollies made according to this general design have been in a multitude of places and in extremely large numbers.

In a constant attempt to improve this general type of equipment, and simultaneously to minimize the cost thereof, I have provided a dolly construction which materially diminishes the cost of the finished dolly together with materially improving its appearance and sturdiness, all without greatly changing the overall size or shape thereof so that dollies made according to my invention will be usable interchangeably with dollies of the prior art.

Accordingly the objects of the invention are:

(1) To provide a design for a small, low dolly of size and shape rendering it interchangeable in use with dollies of previously commonly known design and yet capable of manufacture at a much lower cost than dollies made according to previous practices;

(2) To provide a design for a dolly, as aforesaid, which substantially improve the appearance thereof;

(3) To provide a design for a dolly, as aforesaid, wherein the frame structure can be made from a single piece of material, preferably of an extrudable non-corrosive material such as aluminum;

(4) To provide a design for a dolly, as aforesaid, wherein the caster structure can be utilized to replace the previously conventional corner reinforcing members;

(5) To provide a dolly construction, as aforesaid, which can be constructed of fewer parts than is common in present dolly construction;

(6) To provide a dolly construction, as aforesaid, in which the resulting dolly will be of strength and serviceability at least equal to, and preferably substantially exceeding, dollies made according to present practices;

(7) To provide a dolly construction, as aforesaid, which will be capable of long rigorous and service free use.

Other objects and purposes of the invention will be apparent to persons acquainted with a device of the general type upon reading the following disclosure and inspection of the accompanying drawings.

General description

Figure 1:
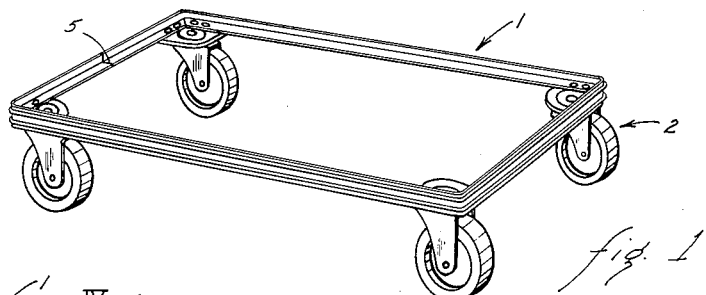
FIGURE 1 is an oblique view of a dolly made according to the invention.
Figure 2:
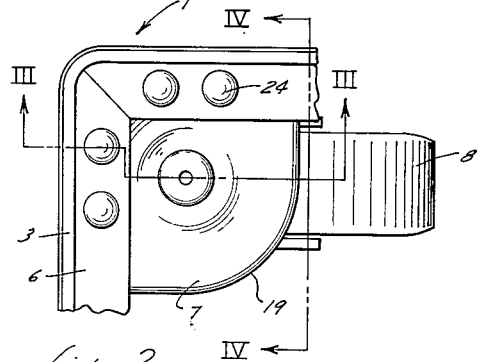
FIGURE 2 is a top plan fragmentary view of one corner of the dolly shown in FIGURE 1.
Figure 4:
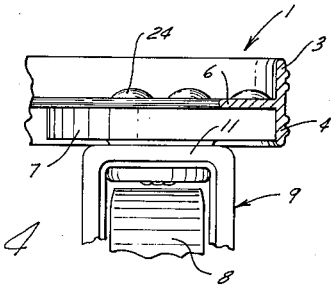
FIGURE 4 is a section taken on the line IV—IV of FIGURE 2.

In general, a dolly embodying the present invention is made of a single strip of extrudable, preferably non-corrosive, material, such as aluminum, having a substantially T-shaped cross-section, the stem of the T being cut out at the corners to permit the piece to be bent to form a frame structure, normally rectangular, of suitable size and shape caster devices having an upper plate portion are then affixed to the horizontal, or stem, portions of said frame to constitute both means for fastening said casters to said frame and suitable reinforcement at and across said frame corners.

Detailed description

In the following description certain terminology will be used as a matter of convenience and for reference. It will be recognized that such terminology is employed solely for convenience and is in no sense limiting. For example, the terms "upward," "downward" and "horizontal," and words of similar import and derivatives thereof, will be used with reference to directions with respect to the dolly when in its normal position of use. The terms "inward" and "outward," and words of similar import and derivatives thereof, are taken with respect to the dolly, or specific parts thereof, and refer to directions toward or away from the geometric center of the dolly or portion thereof in connection with which said terminology is used.

Referring now to the drawings in more detail, there is shown a frame structure 1 which in this case is rectangular and has a plurality of casters 2 arranged with one at each corner of said frame.

Figure 3:
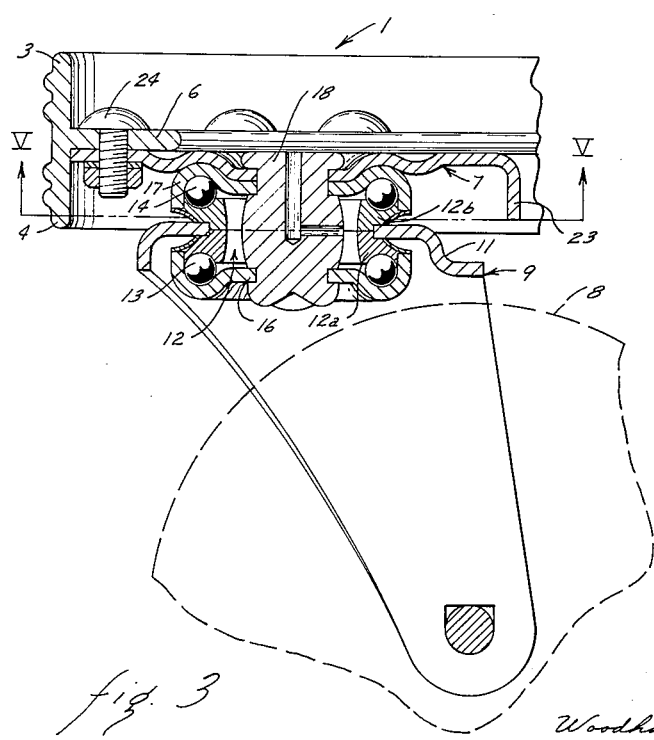
FIGURE 3 is a section taken on the line III—III of FIGURE 2.

The frame structure preferably consists of a single piece of material, which will preferably be of extrudable non-corrosive material, such as aluminum, and in this embodiment consists of a T-shaped cross-section (FIGURE 3) having an upstanding flange 3, a depending skirt 4 and a horizontally extending stem 6. The frame is formed by mitering the stem 6 at four selected points corresponding to the four corners of the frame. The entire frame structure can then be bent at each of the positions where the stems 6 are mitered, thereby forming the four corners of the dolly. The free ends of the frame member are then brought together along one side or end of the dolly and welded or otherwise fastened in any manner as convenient. In this embodiment a welded joint is indicated at 5. This then provides a strong and rigid frame structure made from a single piece and one which can be made rapidly and by the use of relatively simple equipment.

The casters utilized may be any of several types, either swivel or fixed or part swivel and part fixed, provided only that the upper plate 7 thereof be provided in accordance with the present disclosure, as hereinafter described in more detail.

While a caster suitable for the present purpose is shown and described in detail in my application Serial No. 678,287, and since issued as Patent No. 2,944,280, to which reference is hereby invited for the purpose of convenience in fully disclosing the present invention, same will be hereinafter briefly described with the understanding that the specific details of construction of the caster so described are for illustrative purposes only and are not to be taken as limiting.

In this structure, a caster wheel 8 is supported on a fork 9 whose top plate 11 is received within a bearing ring 12 which ring may if desired be comprised of two rings 12a and 12b as shown or may comprise a single ring. The groups 13 and 14 of bearing balls which bear against the upper and lower sides of the bearing ring 12, are held at their respective upper and lower sides by upper and lower retainer plates 16 and 17. The mounting plate 7 is positioned adjacent the upper surface of the bearing retainer 17 and the whole assembly of mounting plate 7, retains 16 and 17, together with bearings and rings 12 are all held together by the pin 18 whose ends are suitably upset for fastening purposes.

Figure 5:
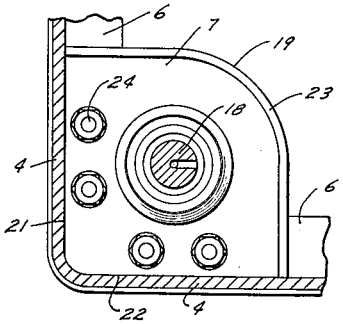
FIGURE 5 is a section taken on the line V—V of FIGURE 3.

The mounting plate 7 is of generally rectangular shape with one corner rounded off as indicated at 19. Said plate fits snugly with its edges 21 and 22 (FIGURE 5) in contact with those portions of the depending skirt 4 which are adjacent both said edges. A depending flange 23 extends around the other two sides of said plate 7 and the rounded corner 19 for reinforcing purposes. The depending flange 23 is in the drawings shown as extending all of the way to the flanges 4 on both sides of the corner. While this is the preferred construction for maximum strength, it will be apparent that said flanges may be cut off somewhat short of the extent as is here shown but it should extend at least a reasonable distance under the stems 6 adjacent each of the respective ends thereof.

Suitable fastening devices, such as the bolt and nut assemblies 24, are provided through the stem 6 into the plate 7, bolts being placed adjacent both edges 21 and 22 of said plate 7. Thus, the fastening plate 7 of said caster construction functions also as a reinforcing member across each corner of the frame structure 1 and thus both holds the caster firmly with respect thereto as well as suitably reinforces the covers of said frame structure. As stated above, the specific disclosure of swivel casters is not intended to limit the invention. In fact, the usual arrangement will involve two swivel casters at one end of the dolly and two fixed casters at the other end of the dolly. In such case, and by way of example, the top plate 11 of the caster yoke 9 is secured directly to the fastening plate 7.

Accordingly, a dolly structure is provided meeting the objects and purposes as above set forth.

While a specific embodiment of the invention has been herein utilized to illustrate the principles thereof, it will be recognized that many variations may be made in said specific structure and all of such variations will be included in the scope of the hereinafter appended claim excepting as said claim may by its own terms expressly require otherwise.

What is claimed is:

In a dolly structure having a frame element arranged in a rectangle, said frame element having a substantially vertical flange and a substantially horizontal web integral with and projecting from said flange toward the center of the rectangle and extending around said flange between the upper and lower edges thereof, a caster construction secured to said web at a corner of said rectangle for supporting and bracing said corner, comprising: a caster yoke having a swivel plate with a central opening therethrough; a caster wheel rotatably supported within said yoke; a center pin extending through said central opening in the swivel plate and having an annular groove near its upper end; a bearing structure having a pair of substantially identical bearing assemblies located upon opposite sides of said swivel plate for pivotally supporting said yoke upon said pin, each bearing assembly comprising a thrust ring adjacent said swivel plate, a retainer ring remote from said swivel plate and a plurality of bearing balls between said thrust ring and its corresponding retainer ring, the swivel plate being clamped between the peripheral portions of said thrust rings; a substantially rectangular mounting plate having one corner rounded on a radius substantially concentric with said pin and defining a quarter of a circle, said mounting plate having a central opening concentric with said quarter circle, the portion of said mounting plate surrounding said central opening and the radially inner edge of the adjacent retainer ring being snugly received and rigidly held within said annular groove, and said mounting plate being perpendicular to the central axis of said center pin; an integral downwardly projecting flange evtending around said rounded corner and along the two edges adjacent thereto; and means for rigidly securing said mounting plate to the lower side of the horizontal web with the other two edges of said mounting plate against the vertical flange on the frame element, said pin being disposed between the inner edge of the web and the center of the frame.

References Cited in the file of this patent

UNITED STATES PATENTS

| | | |
|---|---|---|
| 1,853,007 | Stannard | Apr. 5, 1932 |
| 1,949,448 | Brokaw et al. | Mar. 6, 1934 |
| 2,575,968 | McCallum et al. | Nov. 20, 1951 |
| 2,589,847 | Noelting et al. | Mar. 18, 1952 |
| 2,787,804 | Noelting et al. | Apr. 9, 1957 |
| 2,840,384 | Bard | June 24, 1958 |

FOREIGN PATENTS

| | | |
|---|---|---|
| 694,707 | Great Britain | July 22, 1953 |
| 172,003 | Switzerland | Dec. 1, 1934 |